US012807184B2

(12) United States Patent
Shin et al.

(10) Patent No.: US 12,807,184 B2
(45) Date of Patent: Nov. 24, 2026

(54) METHOD AND APPARATUS WITH REAL-TIME PATH FINDING

(71) Applicant: Samsung Electronics Co., Ltd., Suwon-si (KR)

(72) Inventors: Seho Shin, Suwon-si (KR); Jinhyuk Choi, Suwon-si (KR); Yonggonjong Park, Suwon-si (KR); Moonsub Byeon, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 160 days.

(21) Appl. No.: 18/662,473

(22) Filed: May 13, 2024

(65) Prior Publication Data

US 2025/0074467 A1 Mar. 6, 2025

(30) Foreign Application Priority Data

Sep. 4, 2023 (KR) ........................ 10-2023-0117186

(51) Int. Cl.
*B60W 60/00* (2020.01)
*G06N 3/04* (2023.01)

(52) U.S. Cl.
CPC ........... *B60W 60/0015* (2020.02); *G06N 3/04* (2013.01); *B60W 2554/80* (2020.02); *B60W 2556/10* (2020.02)

(58) Field of Classification Search
None
See application file for complete search history.

(56) References Cited

U.S. PATENT DOCUMENTS 9,568,915 B1 * 2/2017 Berntorp ........... B60W 30/0956
11,274,929 B1 * 3/2022 Afrouzi ..................... G06T 7/30
11,586,960 B2 2/2023 Harris et al.
(Continued)

FOREIGN PATENT DOCUMENTS

CN 108592912 A * 9/2018 ........... G01S 17/931
CN 114882970 A * 8/2022 ......... G06F 18/2155
(Continued)

OTHER PUBLICATIONS

Machine translation of CN-108592912-A (Year: 2018).*
(Continued)

*Primary Examiner* — Christian Chace
*Assistant Examiner* — Scott R Jagolinzer
(74) *Attorney, Agent, or Firm* — NSIP Law

(57) ABSTRACT

A processor-implemented method including embedding sensing information, from a plurality of sensors, at a current time point with a previous path of a vehicle at a previous time point and topology information for a topology including plural nodes at the previous time point, determining, by inputting the embedded sensing information to a topology-based neural network, a first distribution area and a second distribution area within a search area, where the first distribution area includes a determined feasible path and the second distribution area includes disconnected nodes that are determined to be reconnected or rewired due to an obstacle, and generating a current path at the current time point from a target location of the vehicle to a current position of the vehicle using topology information at the current time point determined based on the determining.

19 Claims, 10 Drawing Sheets

(56) References Cited

U.S. PATENT DOCUMENTS

| | | | | |
|---|---|---|---|---|
| 2016/0375901 | A1* | 12/2016 | Di Cairano | B60W 30/09 701/26 |
| 2018/0052460 | A1* | 2/2018 | Kurt | B60W 30/06 |
| 2018/0089563 | A1* | 3/2018 | Redding | G05D 1/0088 |
| 2020/0377085 | A1* | 12/2020 | Floyd-Jones | B60W 60/0017 |
| 2021/0156693 | A1* | 5/2021 | Aldeborgh | G01C 21/206 |
| 2021/0323578 | A1 | 10/2021 | Wang et al. | |
| 2022/0017116 | A1* | 1/2022 | Rivera | B60W 60/0025 |
| 2022/0063668 | A1* | 3/2022 | Wallin | B60W 60/00274 |
| 2022/0153315 | A1* | 5/2022 | Zeng | G06N 3/09 |
| 2022/0250641 | A1 | 8/2022 | Seegmiller et al. | |
| 2022/0274625 | A1* | 9/2022 | Garimella | G06N 3/044 |
| 2023/0356748 | A1* | 11/2023 | Hetang | G05B 13/0265 |
| 2024/0383470 | A1* | 11/2024 | Jang | B60W 30/09 |

FOREIGN PATENT DOCUMENTS

| | | | |
|---|---|---|---|
| EP | 3 971 047 | A1 | 3/2022 |
| KR | 10-1096592 | B1 | 12/2011 |
| KR | 10-1664582 | B1 | 10/2016 |
| KR | 10-2395879 | B1 | 5/2022 |

OTHER PUBLICATIONS

Machine translation of CN-114882970-A (Year: 2022).*

Choudhury et al. "The Planner Ensemble: Motion Planning by Executing Diverse Algorithms" *2015 IEEE International Conference on Robotics and Automation* (*ICRA*). IEEE, 2015 (pp. 1-7).

Li et al. "Efficient Heuristic Generation for Robot Path Planning with Recurrent Generative Model" *arXiv preprint arXiv:2012.03449v1* Dec. 7, 2020 (pp. 1-7).

LaValle, Steven. "Rapidly-Exploring Random Trees: A New Tool for Path Planning." Research Report 9811, 1998, (4 pages).

Kontoudis, George P., et al., "Kinodynamic Motion Planning With Continuous-Time Q-Learning: An Online, Model-Free, and Safe Navigation Framework." IEEE transactions on neural networks and learning systems 30.12 (2019): 3803-3817.

Katyal, Kapil D., et al. "High-Speed Robot Navigation using Predicted Occupancy Maps." 2021 IEEE International Conference on Robotics and Automation (ICRA). IEEE, 2021., (7 pages).

Guerrero, Eric, et al., "Adaptive Visual Information Gathering for Autonomous Exploration of Underwater Environments." IEEE Access 9 (2021): 136487-136506.

Extended European search report issued on Oct. 16, 2024, in counterpart European Patent Application No. 24172066.3 (13 pages).

* cited by examiner

METHOD AND APPARATUS WITH REAL-TIME PATH FINDING

CROSS-REFERENCE TO RELATED APPLICATIONS

This application claims the benefit under 35 USC § 119 (a) of Korean Patent Application No. 10-2023-0117186, filed on Sep. 4, 2023, in the Korean Intellectual Property Office, the entire disclosure of which is incorporated herein by reference for all purposes.

BACKGROUND

1. Field

The following description relates to a method and apparatus with real-time path finding.

2. Description of Related Art

As the demand for an autonomous driving technique increases, various techniques to support driving have been developed. For example, a lane departure warning system (LDWS) may determine whether a vehicle deviates from a driving lane as a method of driver assistance, and adaptive cruise control (ACC) may automatically control the velocity of a vehicle while maintaining a predetermined distance from a car ahead. In addition, an advanced driver assistance system (ADAS) and/or an autonomous driving system (AD) including the techniques described above may control an operation of a vehicle or may notify the driver of the vehicle when the vehicle recognizes and determines driving situations, such as an obstacle or dangerous condition, while the driver is driving by using a detection sensor, an image processing sensor, a communication device, and the like. For example, the ADAS may provide driving information by finding a path in real time by recognizing lanes of a driving road be either using an image from a camera and/or from pre-built map information.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In a general aspect, here is provided a processor-implemented method including embedding sensing information, from a plurality of sensors, at a current time point with a previous path of a vehicle at a previous time point and topology information for a topology including plural nodes at the previous time point, determining, by inputting the embedded sensing information to a topology-based neural network, a first distribution area and a second distribution area within a search area, where the first distribution area includes a determined feasible path and the second distribution area includes disconnected nodes that are determined to be reconnected or rewired due to an obstacle, and generating a current path at the current time point from a target location of the vehicle to a current position of the vehicle using topology information at the current time point determined based on the determining.

The embedding may include reordering the topology information at the previous time point based on previous path nodes corresponding to the previous path at the previous time point and embedding the reordered topology information with the sensing information at the current time point.

The reordering of the topology information at the previous time point may include assigning a weight to paths, included in the topology information at the previous time point, based on a distance from the previous path at the previous time point.

The topology-based neural network may include one or more of a first head, a second head, and a third head, the one or more first head, second head, and third head each being respectively trained to output a respective sampling area corresponding to the first distribution area, the second distribution area, and a third distribution area, the third distribution area including determined prune-eligible nodes which are to be pruned in response to the reordered topology information and the sensing information being received by the topology-based neural network.

The method may include training at least one of the first head, the second head, or the third head based on a first loss based on cross-entropy between a training sampling area and a first ground truth area corresponding to a training search area and a second loss based on a mean squared error between a resultant found previous path and a second ground truth area corresponding to a first distribution area of training the topology-based neural network and a second distribution area of training the topology-based neural network.

The topology information at the previous time point may include information on expanded nodes that were expanded up until the previous time point.

The sensing information at the current time point may include one or more of surrounding environment information on a surrounding object of the vehicle and an obstacle around the vehicle, a current location of the vehicle, and the target location of the vehicle and wherein the method may include receiving the surrounding environment information from a sensor or capturing an image of the surrounding environment information from an image sensor.

The determining of the first distribution area and the second distribution area may include expanding one or more of the plural nodes according to a determined feasible path found in the first distribution area and rewiring one or more of the plural nodes that are determined to be disconnected, in which the plural nodes are determined to be disconnected or newly connected, in the second distribution area based on the topology information at the previous time point and the sensing information at the current time point.

The expanding of the plural nodes may include performing first sampling on the determined feasible path non-uniformly in the first distribution area, performing second sampling on the determined feasible path randomly in an entirety of the search area, and performing the expanding of one or more of the plural nodes based on a first sampling result and a second sampling result.

In a third distribution area, the identified prune-eligible nodes may be pruned from the topology upon a determination that one or more of the plural nodes are irrelevant to a moving path of the vehicle and the prune-eligible nodes may be identified based on the third distribution area, from the topology information at the previous time point.

The prune-eligible nodes may include one or more of a first node in an area where the vehicle has passed at the current time point and a second node in an area irrelevant to a moving path of the vehicle.

The method may include assigning objects observed in the second distribution area to be objects of interest by identifying location information of the vehicle changed from the current path at the current time point based on the sensing information of the current time point and the one or more rewired nodes.

The method may include iteratively finding the current path at the current time point from the target location of the vehicle to a moved current location of the vehicle as the vehicle moves.

In a general aspect, here is provided a training method of a neural network including receiving a training data set that includes sensing information of a vehicle at a previous time point, topology information for a topology including plural nodes at the previous time point, a first area including a feasible path at a current time point corresponding to the topology information at the previous time point, a second area in which blocked nodes of the plural nodes are determined for rewiring due to an obstacle at the current time point, and a third area in which prune-eligible nodes of the plural nodes are to be pruned as being irrelevant to a moving path of the vehicle at the current time point and training the neural network to output one or more sampling areas, the sampling areas including a first distribution area including the feasible path, a second distribution area including the blocked nodes, and a third distribution area including the prune-eligible nodes based on the training data set.

The neural network may include a first head, a second head, and a third head, the first head, the second head, and the third head being respectively trained to output respective sampling areas corresponding to the first distribution area, the second distribution area, and the third distribution area in response to the topology information in which the nodes are rewired and the sensing information at the current time point being received by the neural network.

The training method may include training at least one of the first head, the second head, or the third head based on a first loss based on cross-entropy between a first respective ground truth area corresponding to a training first distribution area of training the neural network, a training second distribution area of training the neural network, and a training third distribution area of training the neural network, and a training sampling area corresponding to the first distribution area, the second distribution area, and the third distribution area and a second loss based on a mean squared error between a previous path found by the neural network and a second respective ground truth area corresponding to the first training distribution area, the second training distribution area, and the third training distribution area.

In a general aspect, here is provided an electronic apparatus including processors configured to execute instructions, a plurality of sensors configured to sense sensing information at a current time point, and a memory storing the instructions, wherein execution of the instructions configures the processors to embed the sensing information at the current time point with a previous path of a vehicle at a previous time point and topology information of a topology including plural nodes at the previous time point, determine, by inputting the embedded sensing information to a topology-based neural network, a first distribution area, a second distribution area, and a third distribution area within a search area, where the first distribution area includes a determined feasible path, the second distribution area includes disconnected nodes that are determined to be reconnected or rewired due to an obstacle, and the third distribution area includes prune-eligible nodes that are determined to be pruned from the topology as being irrelevant to a moving path of the vehicle, and generate a current path at the current time point from a target location of the vehicle to a current position of the vehicle using topology information at the current time point determined based on the first distribution area, the second distribution area, and the third distribution area.

The processors may be configured to expand one or more of the plural nodes according to a determined feasible path found in the first distribution area, rewire the one or more plural nodes in an area in which one or more of the plural nodes are determined to be disconnected or newly connected, in the second distribution area, based on the topology information at the previous time point and the sensing information at the current time point, and among the rewired nodes, prune a prune-eligible node, based on the third distribution area, from the topology information.

The embedding may include reordering the topology information at the previous time point based on previous path nodes corresponding to the previous path at the previous time point and embedding the reordered topology information with the sensing information at the current time point, and the topology-based neural network may include a first head, a second head, and a third head respectively trained to output a respective sampling area corresponding to the first distribution area, the second distribution area, and a third distribution area may include the determined prune-eligible nodes in response to the reordered topology information and the sensing information at the current time point being received by the topology-based neural network.

At least one of the first head, the second head, or the third head may be trained based on a first loss based on cross-entropy between a training sampling area and a first ground truth area corresponding to a training search area and a second loss based on a mean squared error between a resultant found previous path and a second ground truth area corresponding to a first distribution area of training the topology-based neural network and a second distribution area of training the topology-based neural network, and the apparatus may include a vehicle.

Figure 1A:
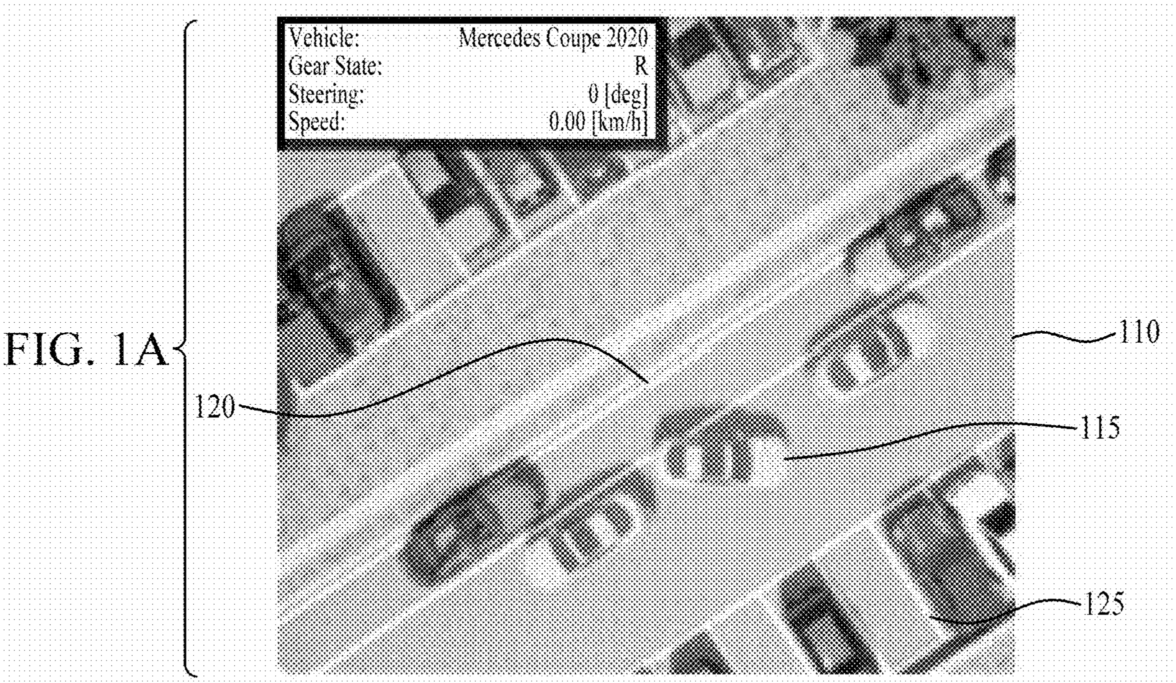
FIGS. 1A-1C illustrate example topologies used for real-time path finding and an example method according to one or more embodiments.

Throughout the drawings and the detailed description, unless otherwise described or provided, the same drawing reference numerals may be understood to refer to the same or like elements, features, and structures. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences within and/or of operations described herein are merely examples, and are not limited to those set forth herein, but may be changed as will be apparent after an understanding of the disclosure of this application, except for sequences within and/or of operations necessarily occurring in a certain order. As another example, the sequences of and/or within operations may be performed in parallel, except for at least a portion of sequences of and/or within operations necessarily occurring in an order, e.g., a certain order. Also, descriptions of features that are known after an understanding of the disclosure of this application may be omitted for increased clarity and conciseness.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

Throughout the specification, when a component or element is described as being "on", "connected to," "coupled to," or "joined to" another component, element, or layer it may be directly (e.g., in contact with the other component or element) "on", "connected to," "coupled to," or "joined to" the other component, element, or layer or there may reasonably be one or more other components, elements, layers intervening therebetween. When a component or element is described as being "directly on", "directly connected to," "directly coupled to," or "directly joined" to another component or element, there can be no other elements intervening therebetween. Likewise, expressions, for example, "between" and "immediately between" and "adjacent to" and "immediately adjacent to" may also be construed as described in the foregoing.

The terminology used herein is for describing various examples only and is not to be used to limit the disclosure. The articles "a," "an," and "the" are intended to include the plural forms as well, unless the context clearly indicates otherwise. As non-limiting examples, terms "comprise" or "comprises," "include" or "includes," and "have" or "has" specify the presence of stated features, numbers, operations, members, elements, and/or combinations thereof, but do not preclude the presence or addition of one or more other features, numbers, operations, members, elements, and/or combinations thereof, or the alternate presence of an alternative stated features, numbers, operations, members, elements, and/or combinations thereof. Additionally, while one embodiment may set forth such terms "comprise" or "comprises," "include" or "includes," and "have" or "has" specify the presence of stated features, numbers, operations, members, elements, and/or combinations thereof, other embodiments may exist where one or more of the stated features, numbers, operations, members, elements, and/or combinations thereof are not present.

Unless otherwise defined, all terms, including technical and scientific terms, used herein have the same meaning as commonly understood by one of ordinary skill in the art to which this disclosure pertains and based on an understanding of the disclosure of the present application. Terms, such as those defined in commonly used dictionaries, are to be interpreted as having a meaning that is consistent with their meaning in the context of the relevant art and the disclosure of the present application and are not to be interpreted in an idealized or overly formal sense unless expressly so defined herein. The use of the term "may" herein with respect to an example or embodiment, e.g., as to what an example or embodiment may include or implement, means that at least one example or embodiment exists where such a feature is included or implemented, while all examples are not limited thereto.

Examples of a driving system may be used to mark a lane line in an augmented reality navigation system of a smart vehicle and the like or generate visual information for assisting the steering of an autonomous vehicle. In addition, the example driving system may be used to assist safe and comfortable driving by interpreting visual information through a device including an intelligent system, which may include a display or a heads up display (HUD), as non-limiting examples, provided in a vehicle to provide driving assistance or in a system that may perform fully autonomous driving. In a non-limiting example, such driving systems may be, or applied to, autonomous vehicles, intelligent vehicles, smartphones, mobile devices, and the like.

Figure 1B:
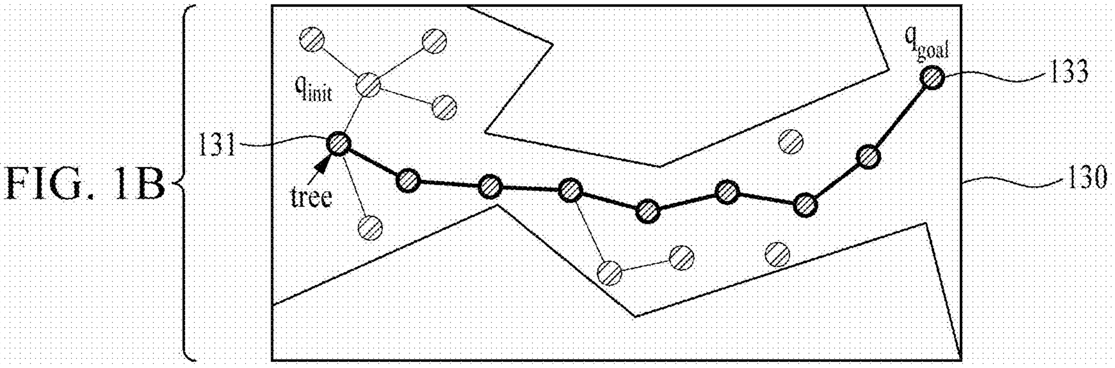
Figure 1C:
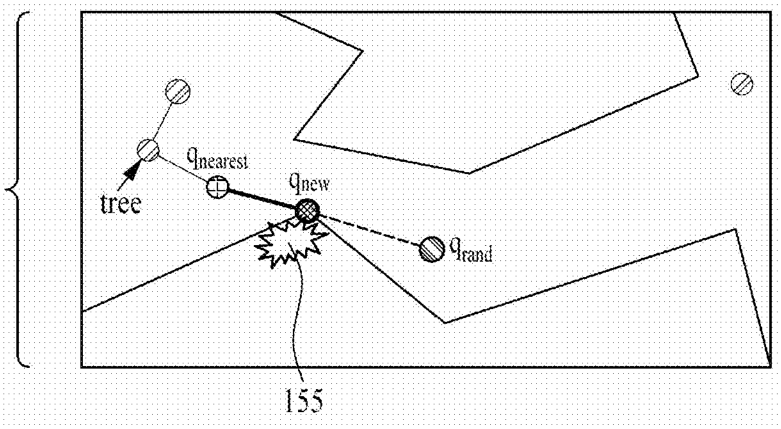

FIGS. 1A-1C illustrate example topologies used for real-time path finding and an example method which may be performed according to one or more embodiments. FIG. 1A, in a non-limiting example, may illustrate an example of a driving situation (e.g., an attempt at parking in parking spots 120 or 125 from the road 110) for a vehicle 115, while diagram 130 of FIG. 1B may illustrate a topology used for real-time path finding for the vehicle 115. Diagram 150 of FIG. 1C may illustrate a situation in which a collision occurs with an obstacle 155.

The vehicle 115 may include all modes and means of transport mechanisms for moving a person or an object with a driving motor or engine, such as a car, a bus, a motorcycle, or a truck. In an example, the vehicle 115 may be an intelligent vehicle including an advanced driver assistance system (ADAS) and/or an autonomous driving system (ADS), in which the intelligent vehicle recognizes and determines some situations while driving by using sensors, an image processor, and/or a communication device, and controls an operation of the intelligent vehicle or notifies a driver of the intelligent vehicle of the situations. The ADAS may provide the vehicle 115 with information regarding the presence of an obstacle, a surrounding traffic situation, lane lines of the road 110 and other relevant driving information that may recognized using an image obtained from a camera and/or map information that has been established in advance. In addition, the vehicle 115 may be provided with additional driving information including a lane recognized in association with a driving road through a navigation system provided in the vehicle. In an example, the vehicle 115 may be referred to as an "ego vehicle".

The ADS or ADAS, as non-limiting examples, may perform path planning and/or path finding to steer the vehicle 115 based on information detected by sensors, which may include a camera and/or a lidar system. A search area of a path may be, for example, divided into a structured space in which lane and traffic information exist and an unstructured space in which lane or traffic information does not exist, such as a parking lot.

In general, in the structured space, a path may be found along a lane or a lane boundary. However, in the unstructured space, typically all drivable spaces were needed to be detected.

For example, in FIG. 1A, when precise control of the vehicle 115 may have been typically required due to a narrow parking space (e.g., parking space 125), a typical path finding may fail if a drivable space is discretized. Thus, in an unstructured space, such as the continual parking spaces 120 to the side of the road 110, a sampling-based path finding approach, which may search all drivable spaces 120 and 125, may typically be used.

In an example, in order to effectively search a space in which the vehicle 115 may travel, the sampling-based path finding approach may configure a topology with sampled areas among a path finding area through a data structure, such as a tree or a graph as illustrated in FIG. 1B. The topology may include, for example, path information corresponding to a previous time point in the form of a tree or a graph. The topology may include multiple nodes corresponding to each path. For example, as illustrated in FIG. 1B, the sampling-based path finding method may calculate an optimal cost path through topology refinement when a connection by expanded nodes is secured by sampling a start location 131 of the vehicle 115 to a target location 133 corresponding to a final destination of the vehicle 115. However, such typical approaches that performing sampling on all drivable spaces and configuring the topology may end up consuming a lot of computation time. Since a computation amount exponentially increases as the search area increases, an electronic apparatus in one or more embodiments may use an alternate method of non-uniform sampling, starting with an area having a greater possibility in which an optimal path may exist rather than the typical uniformly sampling of all available spaces in real-time.

For example, referring to FIG. 1C, when the obstacle 155 occurs in a path in a tree of a topology that is expanded through sampling, the electronic apparatus may find a new path to avoid the obstacle 155 since the tree may be difficult to expand. For example, the obstacle 155 may include a road structure, such as a barrier installed on a driving road and a lane separator, as well as vehicles around the vehicle and a pedestrian, but examples are not limited thereto.

In an example, a path may be found in real-time using a method of non-uniform sampling of areas having a greater possibility of an expected path at a current time point based on deep learning using surrounding environment information and a training data set for the expected path according to one or more embodiments.

Figure 2:
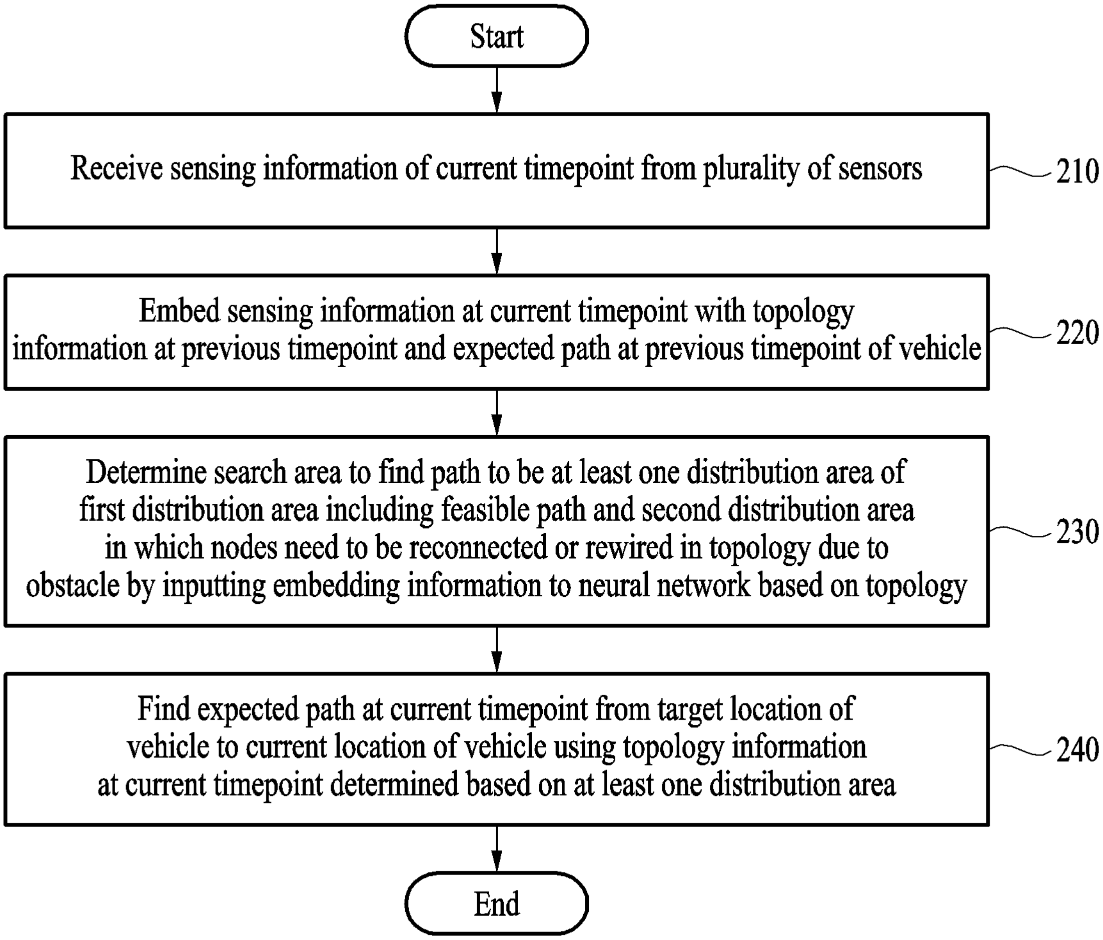
FIG. 2 illustrates an example real-time path finding method according to one or more embodiments.

FIG. 2 illustrates an example real-time path finding method according to one or more embodiments.

Referring to FIG. 2, in a non-limiting example, an electronic apparatus may find an expected path at a current time point through operations 210 to 240. While these illustrated operations may be performed sequentially, examples are not necessarily required to be performed sequentially. For example, the order of the operations may change and at least two of the operations may be performed in parallel. In an example, the electronic apparatus may be a vehicle (e.g., the vehicle 115 of FIG. 1A) or an ADS or ADAS, as non-limiting examples.

In operation 210, the finding apparatus may receive sensing information at a current time point from a plurality of sensors. The sensing of information at the current time point may include, for example, at least one of surrounding environment information including a surrounding object of a vehicle and an obstacle around the vehicle, a current location of the vehicle, and a target location of the vehicle. However, these examples are not limited thereto.

In operation 220, the electronic apparatus may embed an expected path of the previous time point of the vehicle and topology information of the previous information with the sensing information at the current time point received in operation 210. The electronic apparatus may embed pieces of information by reordering the topology based on nodes that correspond to the expected path. The electronic apparatus may reorder topology information at the previous time point based on nodes corresponding to the expected path of the previous time point (i.e., expected path nodes). The electronic apparatus may reorder the topology information at the previous time point by assigning a weight to paths included in the topology information at the previous time point based on a distance from the expected path at the previous time point. In this case, the topology information at the previous time point may include information on nodes that may be expanded up to the previous time point. The electronic apparatus may embed reordered topology information with the sensing information at the current time point.

In operation 230, by inputting the embedded information in operation 220 to a, as a non-limiting example, topology-based neural network (e.g., a topology-based neural network 430 as illustrated below in FIG. 4), the electronic apparatus may determine, for a search area, a first distribution area in which a feasible path may be found. That is, the first distribution area may include an area in which the search for a feasible path is conducted. The electronic apparatus may also determine, within the search area and/or within the first distribution area, a second distribution area which may include one or more nodes in the topology that may involve a reconnection and/or rewiring of these nodes due to the presence of one or more obstacles. The search area and/or the first distribution area may also include a third distribution area in which nodes are allowed to be pruned (i.e., prune-eligible nodes) from the topology because the third distribution area may not be related to a moving path of the vehicle. In this case, the "feasible path" may be understood to be an available path to drive a vehicle. That is, in other words, the feasible path may be a path by which the vehicle may be guided or controlled to reach a target location without interference (i.e., hitting or touching an obstacle or other objects) by avoiding one more obstacles during the actual driving of the vehicle.

The second distribution area may include information on nodes (e.g., a rewiring node or a blocked node) involving reconnection and/or rewiring in a corresponding area. The third distribution area may include information on unused nodes when setting a path, in other words, removable nodes (e.g., a pruning node) from the topology. Examples of the first distribution area, the second distribution area, and the third distribution area are described and illustrated in greater detail below with reference to FIG. 3.

In an example in which the one more distribution areas include the third distribution area, the electronic apparatus may prune a node subject to pruning from the topology information at the previous time point, where the node is identified based on the third distribution area among rewired nodes. In this case, the node subject to pruning may correspond to a removable node when electronic a path because the node is located in an area (an area that is irrelevant to a moving path of the vehicle) that is away from a driving path of a vehicle and does not correspond to the driving path of the vehicle. The node subject to pruning may include, for example, a node located in an area where the vehicle has passed at the current time point and a node located in an area that is irrelevant to a moving path of the vehicle. However, examples are not limited thereto.

In an example, a topology-based neural network may include, for example, at least one of a first head, a second head, and a third head trained to output sampling areas respectively corresponding to the one or more distribution areas including the first distribution area, the second distribution area, and the third distribution area as the reordered topology information and the sensing information at the current time point are inputted. In an example, one or more of the first head, the second head, and the third head may be trained based on a first loss based on cross-entropy between a sampling area and a ground truth area corresponding to the respective distribution area and a second loss based on a mean squared error between a found expected path and a ground truth area corresponding to the distribution area.

The topology-based neural network may be trained to output a sampling area corresponding to a respective distribution area. An example non-limiting operation of the topology-based neural network is described and illustrated in greater detail below with reference to FIG. 5.

In a non-limiting example, operation 230 may also include the electronic apparatus (e.g., electronic apparatus 400) expanding nodes based on a feasible path found in the first distribution area. That is, the electronic apparatus may expand nodes according to a determined, or found, feasible path. In an example, the found feasible path may be found in the first distribution area. The electronic apparatus may perform first sampling on a non-uniformly feasible path in the first distribution area. The electronic apparatus may perform a second sampling on a randomly feasible path in an entirety of the search area. The electronic apparatus may expand nodes in the topology based on a first sampling result and a second sampling result. Based on the topology information at the previous time point and the sensing information at the current time point, the electronic apparatus may rewire nodes in an area in which a disconnection or a connection of nodes may be determined as desirable in the second distribution area. In this case, the rewired nodes may correspond to the rewiring nodes described above.

In operation 240, in an example, the electronic apparatus may find an expected path from a target location of the vehicle to the current location of the vehicle using the determined topology information at the current time point based on the one or more distribution areas that were determined as previously discussed above in operation 230. As the vehicle moves, the electronic apparatus may iteratively find the expected path at the current time point from the target location of the vehicle to the moved current location of the vehicle.

In an example, the electronic apparatus may designate objects that are observed in the second distribution area to be objects of interest by identifying location information of the vehicle that changes in the expected path at the current time point based on the sensing information at the current time point and the rewired nodes. The electronic apparatus may collect sensing information based on the object of interest and may utilize the sensing information to find an expected path at the current time point. The method of setting objects observed in the second distribution area to be objects of interest is described in greater detail below with reference to FIG. 9.

Figure 3:
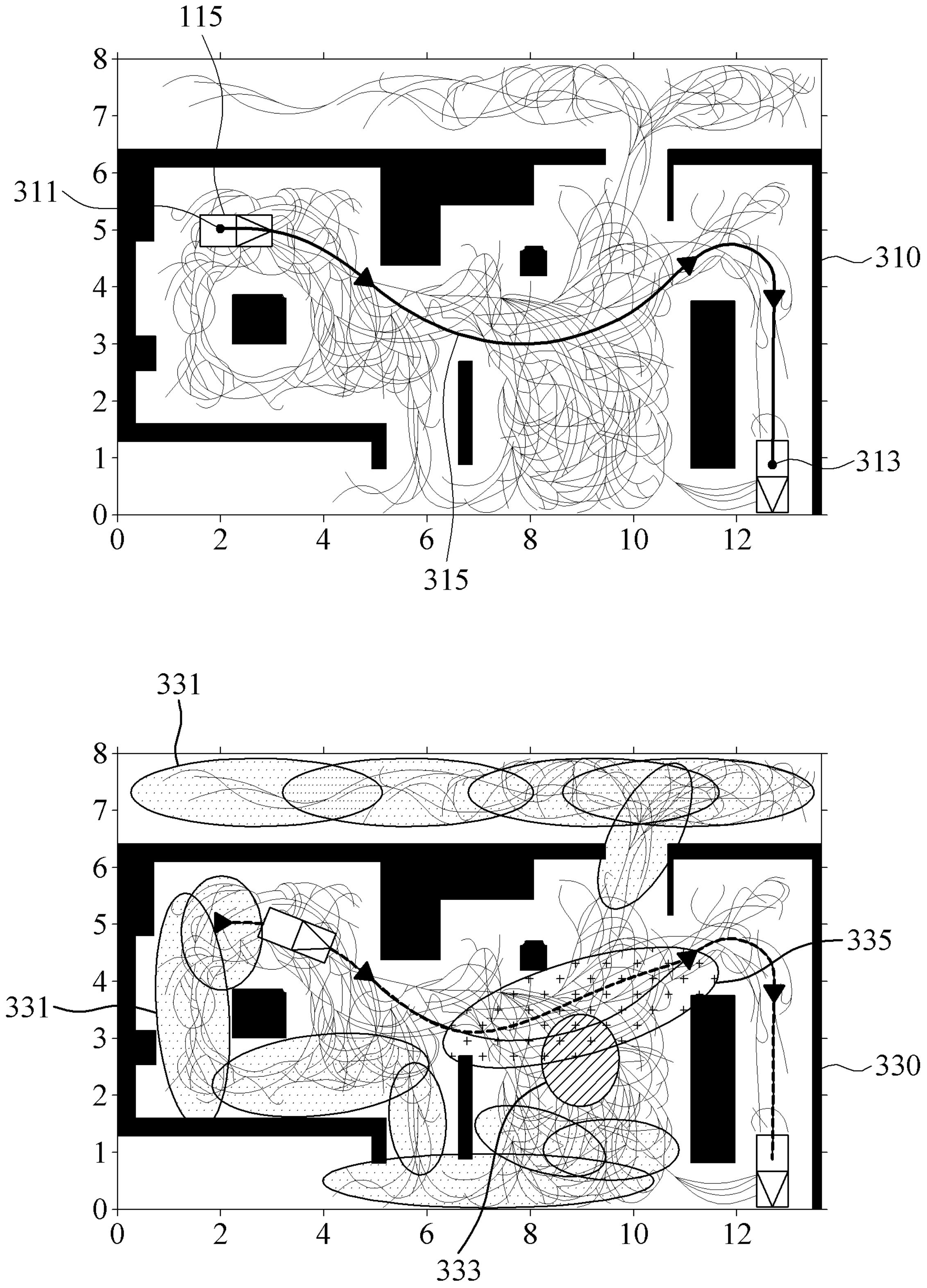
FIG. 3 illustrates an example of a first distribution area, a second distribution area, and a third distribution area determined during a real-time path finding process according to one or more embodiments.

FIG. 3 illustrates an example of a first distribution area, a second distribution area, and a third distribution area determined during a real-time path finding process according to one or more embodiments. Referring to FIG. 3, in a non-limiting example, two scenarios, including a first scenario 310 illustrating a first distribution area including a feasible path 315 according to one embodiment, and a second scenario 330 illustrating a second distribution area 335 in which a reconnection of nodes and/or a rewiring of nodes in a topology due to an obstacle 333 and a third distribution area 331 in which nodes are allowed to be pruned are illustrated.

In an example, after calculating an expected path from input information by a sensor, an electronic apparatus may update, in real time, the path information of a vehicle in driving by a dynamic obstacle or newly detected area information. In this case, when the feasible path 315 is calculated using the sensing information input by sensors at the current time point, selecting and sampling only a distribution of an area required, or desired, for updating may be unavailable. In this case, sampling may be performed on an area to be updated and an irrelevant area among the search area due to the newly detected obstacle 333, an unnecessary expansion of a node may occur in the topology. Since the amount of system memory use due to the unnecessary expansion of a node gradually increases as time elapses, and the number of nodes to be calculated to rewire the nodes also increases, a processing time of a processor used to find a path again may also increase. In addition, such an increase in the number of nodes causes an increase in allocated memory, and thus, a significant security problem may occur in a system with high memory constraints.

In a non-limiting example, the electronic apparatus may perform non-uniform sampling on an area in which an optimal path (e.g., a shortest path) may exist based on deep learning, where the deep learning may result in a greater probability by inputting information obtained by embedding the expected path at the previous time point and the topology information at the previous point with the sensing information at the current time point. In addition, the electronic apparatus may find an optimal path in real time by reducing the number of nodes used for finding, an amount of memory use, and a processing time of a processor by pruning unnecessary nodes and rewiring nodes in the topology.

For example, the electronic apparatus may determine a first distribution area including the feasible path 315 in a topology generated during an initial path planning process from the start location 311 of the vehicle 115 to the target location 313 corresponding to the destination as shown in the first scenario 310. The first distribution area may be referred to as a feasible path distribution area since the first distribution area includes the feasible path 315.

In addition, the electronic apparatus may determine the second distribution area 335 in which nodes may desirably be reconnected or rewired (i.e., disconnected nodes, rewiring nodes, or blocked nodes) in the topology due to the obstacle 333 as shown in the second scenario 330. The second distribution area 335 may correspond to an area in which nodes colliding with the obstacle 333 in the topology need to be disconnected or new nodes avoiding the obstacle 333 need to be connected by considering the topology according to information at the previous time point and changed surrounding environment information (e.g., information on the obstacle 333) at the current time point. The second distribution area 335 may be referred to as a rewiring node distribution area since the nodes in that area may be rewired. The second distribution area 335 may be used as sampling information for selecting nodes of which locations need to be modified in the determined topology at the previous time point according to the information at the previous time point and/or reconnecting nodes with modified locations.

In addition, the electronic apparatus may determine the third distribution area 331 in which nodes are removable from the topology since the nodes are irrelevant to the moving path of the vehicle 115 as shown in the diagram 330. The third distribution area 331 may be, for example, referred to as a pruning node distribution area since the third distribution area 331 is an expected area in which the vehicle 115 may not move in the topology structure in the form of a tree, in other words, a pruning target area.

Figure 4:
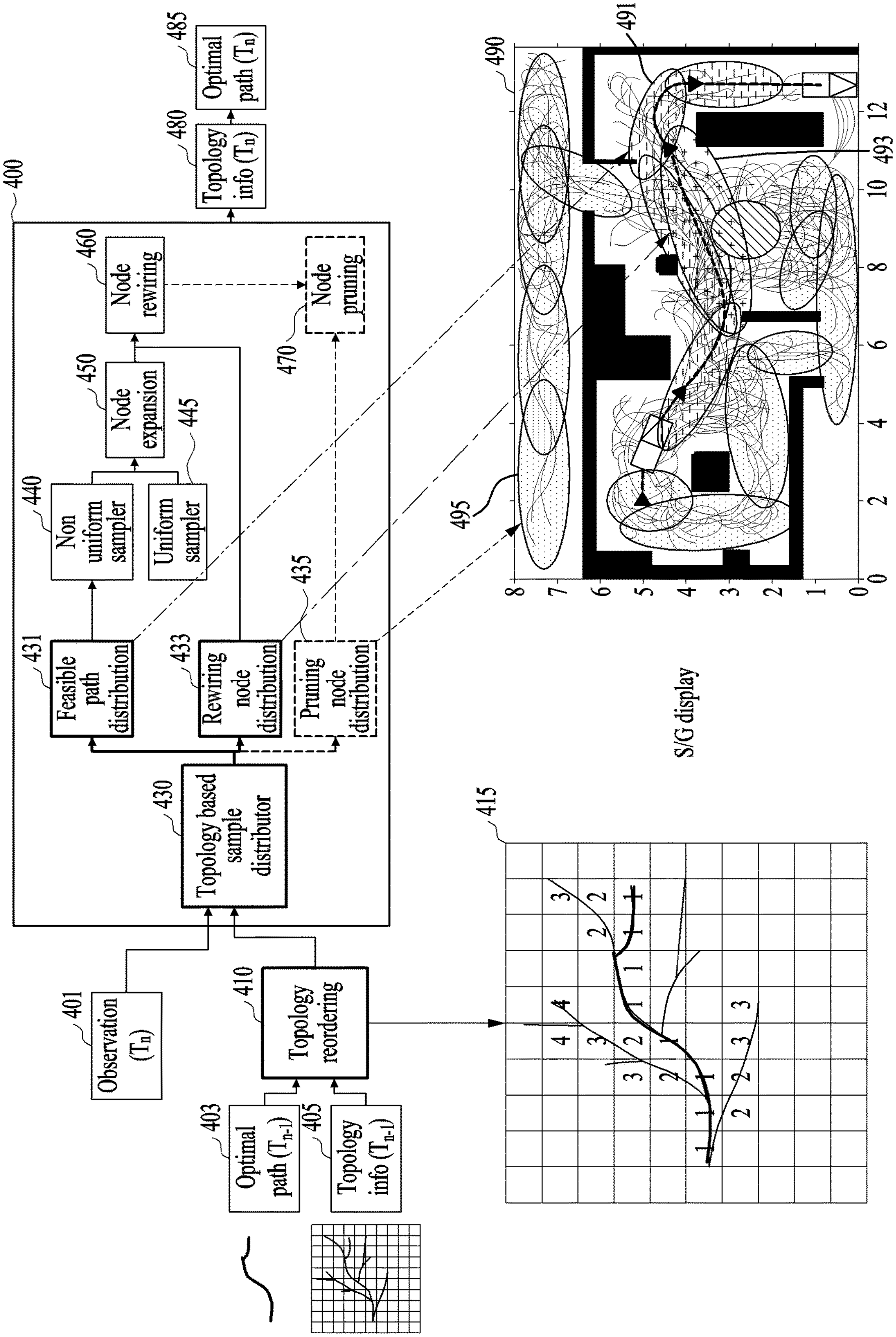
FIG. 4 illustrates an example of a configuration and an operation of an apparatus for real-time path finding according to one or more embodiments.

FIG. 4 illustrates an example apparatus for real-time path finding according to one or more embodiments. Referring to FIG. 4, in a non-limiting example, a structure of an electronic apparatus 400 is illustrated. A portion displayed as a dashed line in FIG. 4 may represent an optionally performable configuration.

In an example, the electronic apparatus 400 may receive sensing information 401 at a current time point $T_n$ from a plurality of sensors. The sensing information 401 may be referred to as observation information since the sensing information 401 is information observed by various sensors installed in a vehicle during the driving of the vehicle. The sensing information may include, for example, surrounding environment information including a surrounding object of the vehicle at the current time point $T_n$ and an obstacle around the vehicle, a current location of the vehicle, and a target location of the vehicle, but not limited thereto.

The electronic apparatus 400 may generate reordered topology information 415 by reordering 410 topology information 405 at a previous time point $T_{n-1}$ based on nodes corresponding to an expected path 403 at the previous time point $T_{n-1}$ and embedding two pieces of information (e.g., the expected path 403 at the previous time point $T_{n-1}$ and the topology information 405 at the previous time point $T_{n-1}$). The reordered topology information 415 may be, for example, a map including expanded trees through sampling, but is not limited thereto. In this case, the previous time point $T_{n-1}$ may correspond to a time point prior to the current time point $T_n$.

The electronic apparatus 400 may reorder the topology information at the previous time point by assigning a weight to paths included in the topology information 405 at the previous time point $T_{n-1}$ based on a distance from the expected path 403 at the previous time point $T_{n-1}$. When the distance from the expected path 403 at the previous time point $T_{n-1}$ is closer than a predetermined standard, the electronic apparatus may assign a great weight (e.g., "1"), such as the reordered topology information 415, to paths included in the topology information 405 at the previous time point $T_{n-1}$. When the distance from the expected path 403 at the previous time point $T_{n-1}$ is farther than a predetermined standard, the electronic apparatus may assign a small weight (e.g., "4"), such as the reordered topology information 415, to paths included in the topology information 405 at the previous time point $T_{n-1}$. The topology information at the previous time point $T_{n-1}$ may include information on nodes that were expanded up until the previous time point $T_{n-1}$ (i.e., expanded nodes). In addition, the topology information may include information on a vehicle state (e.g., posture, velocity, and acceleration) as node information.

The electronic apparatus 400 may input embedding information obtained by embedding the reordered topology information 415 with the sensing information 401 at the current time point $T_n$ to a topology-based neural network 430. In this case, the topology-based neural network 430 may be a neural network trained to classify a search area to find a path based on input information into multiple distribution areas for sampling. The multiple distribution areas for sampling may include, for example, a first distribution area 491, a second distribution area 493, and a third distribution area 495 included in a map 490.

In a non-limiting example, the topology-based neural network 430 may include a first head 431, a second head 433, and a third head 435 that are each respectively trained to output sampling areas that correspond to the first distribution area 491, the second distribution area 493, and the third distribution area 495 as the reordered topology information 415 and the sensing information 401 at the current time point $T_n$ are input to the topology-based neural network 430. The first head 431 may correspond to a neural network trained to output a sampling area corresponding to the first distribution area 491 which may include a feasible path. The second head 433 may correspond to a neural network trained to output a sampling area which may correspond to the second distribution area 493. The third head 435 may correspond to a neural network trained to output a sampling area which may correspond to the third distribution area 495. The first head 431 may be used as a non-uniform sampler to rapidly find an expected path from a global perspective. The second head 433 may provide information on an area in which nodes that need to be disconnected, or connected, in the topology by considering changed surrounding environment information as the vehicle drives. A node rewiring process by the second head 433 may be performed in parallel with a node expansion 450 process and may be effectively applied to rapidly find another expected path. The third head 435 may provide information on a sampling area corresponding to the third distribution area 495 that does not require updating of a node or a node for a passed area at the current time point $T_n$.

In an example, the first head 431, the second head 433, and the third head 435 may be trained based on a first loss based on cross-entropy between sampling areas and ground truth areas corresponding to distribution areas corresponding to the first head 431, the second head 433, and the third head 435, respectively, and a second loss based on a mean squared error between a found expected path and ground truth areas corresponding to distribution areas corresponding to the first head 431, the second head 433, and the third head 435, respectively.

In an example, the electronic apparatus 400 may expand nodes along a feasible path found in the first distribution area 491. The electronic apparatus 400 may perform first sampling 440 on the feasible path non-uniformly in the first distribution area 491. The electronic apparatus 400 may perform second sampling 445 on the feasible path randomly in an entirety of the search area. The electronic apparatus 400 may perform a node expansion 450 process to expand nodes of the topology based on results of the first sampling 440 and the second sampling 445.

The electronic apparatus 400 may perform a node rewiring 460 process to rewire nodes (e.g., rewiring nodes) in an area of the second distribution area 493 in which nodes need to be disconnected or newly connected, based on the topology information 405 at the previous time point $T_{n-1}$ and the sensing information 401 at the current time point $T_n$.

In addition, the electronic apparatus 400 may perform a node pruning 470 process to prune nodes that are subject to pruning from the topology information 405 at the previous time point $T_{n-1}$ among rewired nodes through the node rewiring 460 process, wherein the nodes which are subject to pruning are identified as such based on the third distribution area 495.

The electronic apparatus 400 may reduce an amount of memory use by pruning inefficient nodes in the topology by pruning nodes corresponding to the third distribution area 495 and reconnecting nodes.

The electronic apparatus may generate (i.e., find) an expected path 485 at the current time point $T_n$ with an optimal cost from a target location of the vehicle to a current location of the vehicle using topology information 480 at the current time point $T_n$ generated through the node expansion 450 process, the node rewiring 460 process, and the node pruning 470 process.

Figure 5:
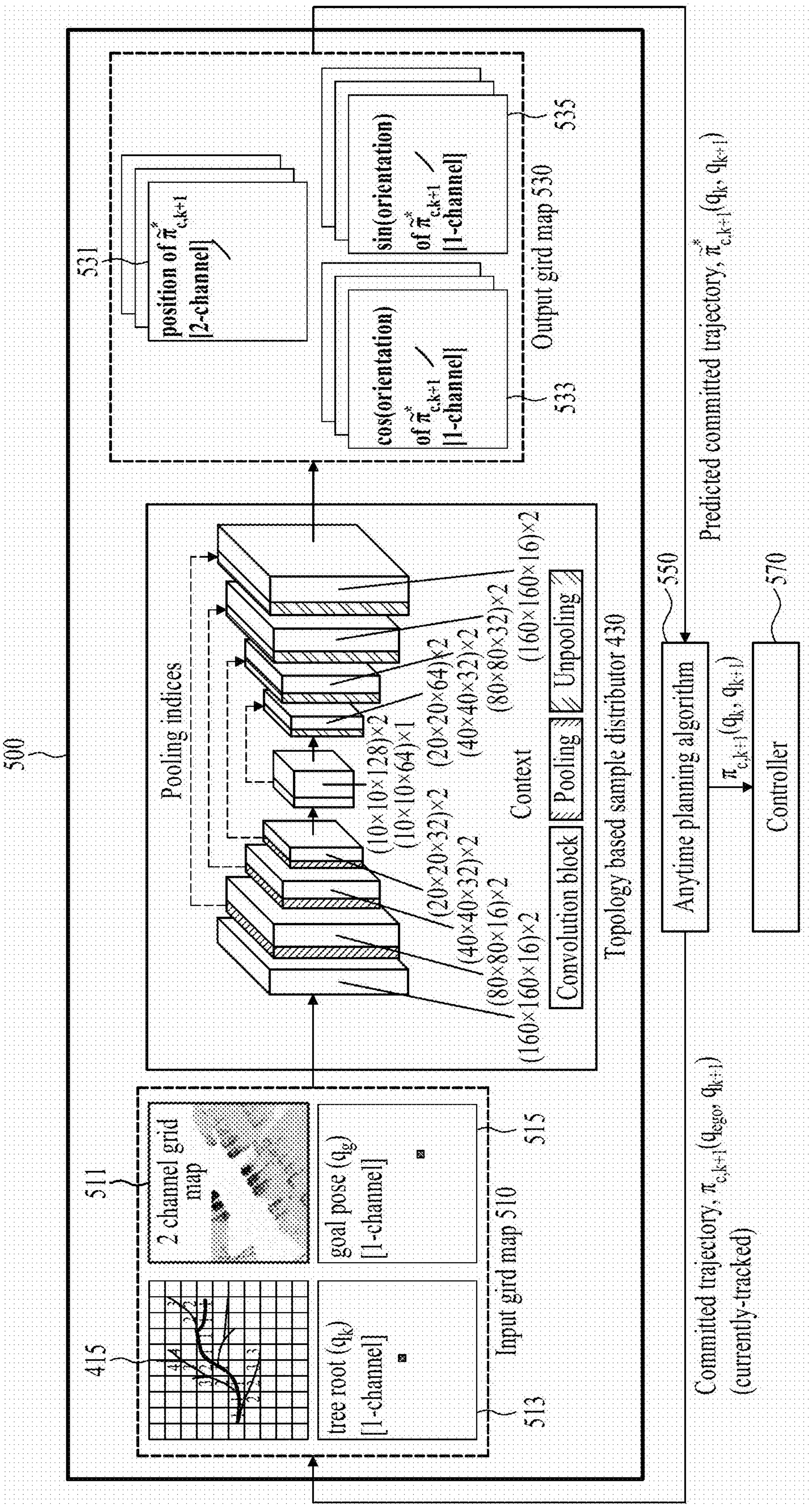
FIG. 5 illustrates an example operation of a topology-based neural network according to one or more embodiments.

FIG. 5 illustrates an example operation of a topology-based neural network according to one or more embodiments. Referring to FIG. 4, in a non-limiting example, a diagram 500 to describe a structure and an operation of the topology-based neural network 430 according to one embodiment is illustrated.

In an example, when an input grid map 510 is input, the topology-based neural network 430 may output an output grid map 530 from the input grid map 510.

In this case, the input grid map 510 may include, for example, reordered topology information 415 corresponding to the previous time point $T_{n-1}$ including expended trees corresponding to the reordered topology information 415, a 2-channel grid map 511, a 1-channel grid map 513 representing a tree root $q_k$, and a 1-channel grid map 515 representing a pose of a target location.

The topology-based neural network 430 may include, for example, a convolution block constituted by convolutional layers, a pooling layer, and an un-pooling layer.

For example, each of the three heads of the topology-based neural network 430 may be trained through optimization of a loss function as in Equation 1 shown below.

$$\text{Loss} = L_{wce}(M_{label}, M_{out}) + L_{wmse}(M_{label}, M_{out}) \qquad \text{Equation 1}$$

In this case, $M_{label}$ may denote a ground truth area corresponding to a ground truth label, and $M_{out}$ may correspond to a sampling area output by each head. In addition, a first term $L_{wce}(M_{label}, M_{out})$ may denote weighted grid cell-wise cross-entropy between a sampling area and a ground truth area corresponding to a respective distribution area corresponding to a respective head. A second term $L_{wmse}(M_{label}, M_{out})$ may denote a grid cell-wise mean squared error between an expected path output by each head and a ground truth area corresponding to a respective distribution area corresponding to a respective head.

Since trajectory information is not included in most grids of a labeled grid map, for example, weights $W_{ce}$ and $W_{mse}$ may be multiplied by a loss function when a grid cell includes the trajectory information.

Equation 1 described above may also be expressed by Equation 2 as shown below.

$$\text{Loss} = \sum_{g \in G} (w_{ce} \cdot L_{ce}(g) + w_{mse} \cdot L_{mse}(g)) \qquad \text{Equation 2}$$

Each of the three heads of the topology-based neural network 430 may calculate a cross-entropy loss value $L_{ce}(g)$ for each cell g in a grid G, and may calculate a final loss by adding a value obtained by multiplying a weight value $W_{ce}$ by the cross-entropy loss value $L_{ce}(g)$ to a value obtained by multiplying $L_{mse}(g)$, which is a grid-wise mean squared error, by a weight value $W_{mse}$.

In this case, a cross-entropy term including $L_{ce}(g)$ may be designed to classify location information of a trajectory on an output grid map. A mean squared error loss term including $L_{mse}(g)$ may be designed to regress direction information of the trajectory on the grid map. The electronic apparatus may infer sampling information on the location information and the direction information by weighting two pieces of information (e.g., $W_{ce}$ and $W_{mse}$) described above to the final loss as described above.

The output grid map 530 may include, for example, a found expected path 531 corresponding to the current time point $T_n$, cosine (cos) pose information 533 of the expected path, and sine (sin) pose information 535 of the expected path.

The output grid map 530 output by the topology-based neural network 430 may be input to an anytime planning algorithm 550. In a non-limiting example, the anytime planning algorithm 550 may provide trajectory control information based on the output grid map 530 to a controller 570. The anytime planning algorithm 550 may be an algorithm to generate a control value before path finding is completed by following a point with the most useful cost before reaching a target point among nodes undergoing tree searching before an optimal path is found.

For example, in the case of parking, it may take several seconds to completely perform optimal path finding, and the anytime planning algorithm 550 may be used to reduce the time for a vehicle to stop and wait. The anytime planning algorithm 550 may manage trees to be in an optimal state while the vehicle is driving.

In an example, the controller 570 may be a logic configured to control a vehicle or a system and may generate trajectory information generated by a path planning algorithm where the trajectory information includes one or more of an acceleration or deceleration value (of a vehicle), a steering angle, an actuator torque of a robot, or a position to be followed by the electronic apparatus.

More specifically, the anytime planning algorithm 550 may correspond to one of sampling-based path planning methods for generating an optimal path by following at least a portion of a tree calculated until a current time point before a feasible path is generated. In an example, the electronic apparatus may use a path planner algorithm based on random sampling instead of the anytime planning algorithm 550.

In addition, the output grid map 530 may be a part of the input grid map 510 and iteratively input to the topology-based neural network 430.

Figure 6:
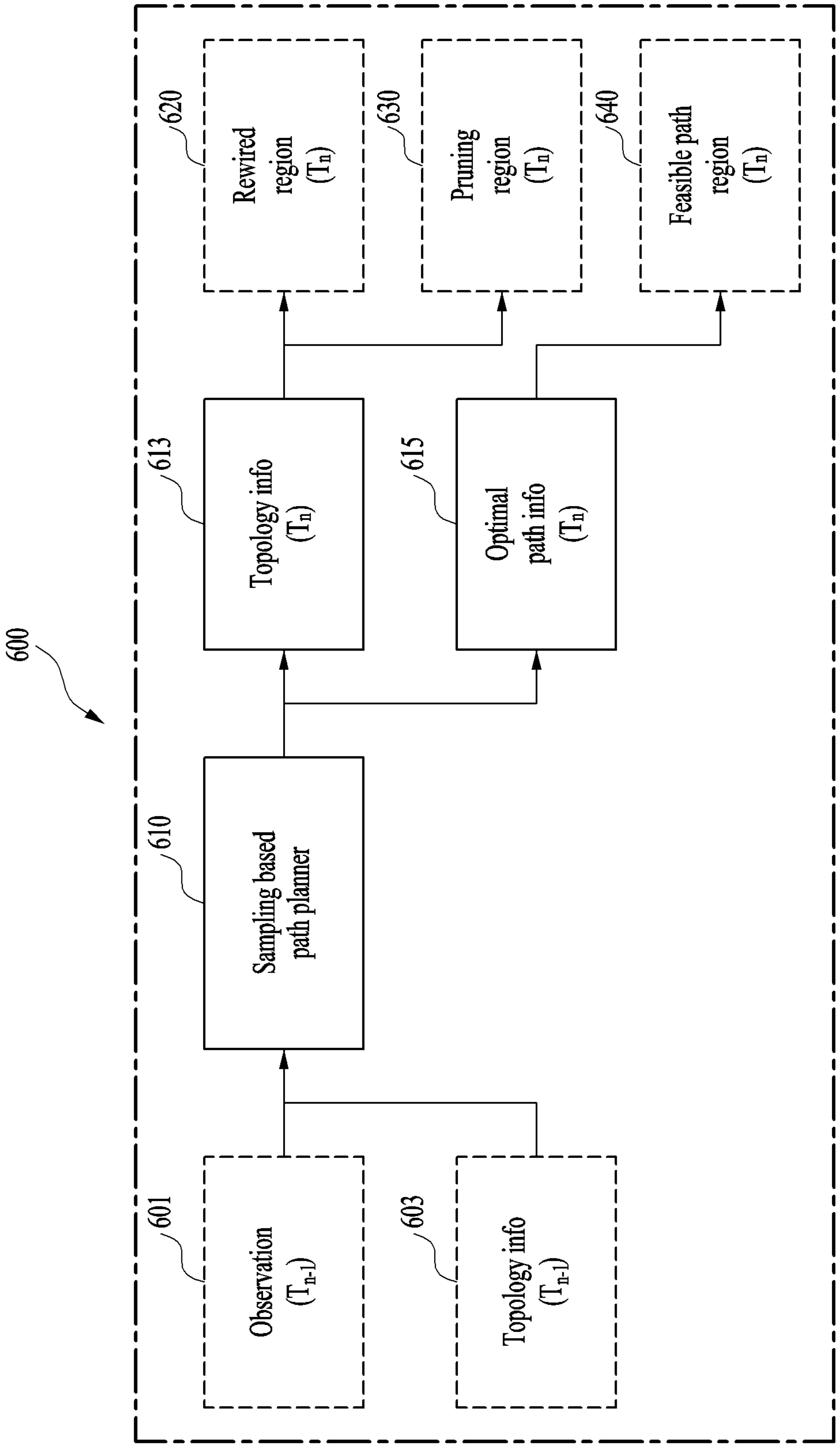
FIG. 6 illustrates an example method of generating training data according to one or more embodiments.
Figure 7:
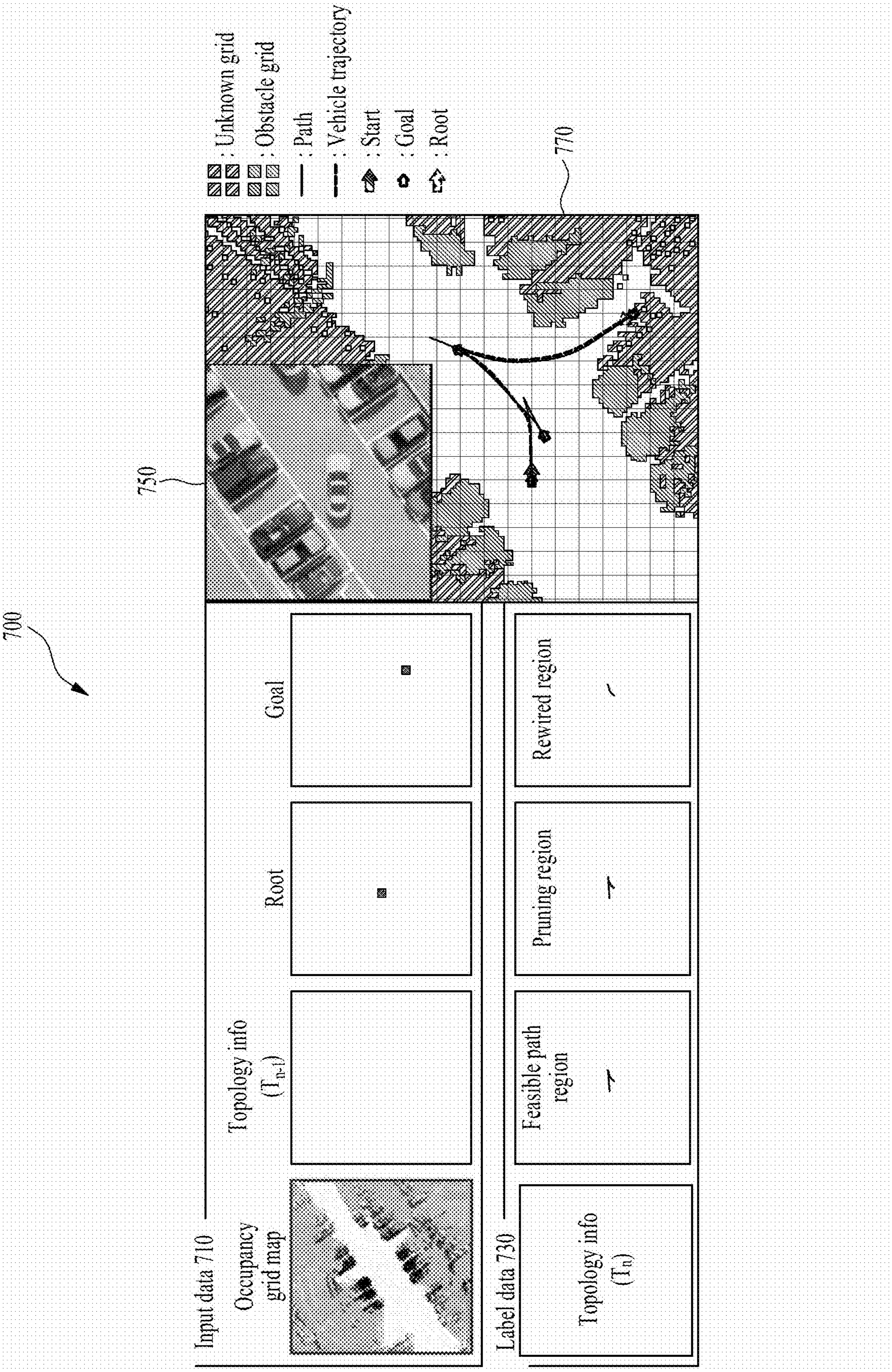
FIG. 7 illustrates an example of training data according to one or more embodiments.

FIG. 6 illustrates an example method of generating training data according to one or more embodiments and FIG. 7 illustrates an example training data process according to one or more embodiments.

Referring to FIG. 6, in a non-limiting example, a generating apparatus 600 that generates training data for the topology-based neural network 430 is illustrated. Referring to FIG. 7, in a non-limiting example, input data 710, label data 730, an input image 750, and an expected path 770 corresponding to the input image 750 are illustrated.

In an example, the generating apparatus 600 may obtain a first area (e.g., a feasible path region) 640 corresponding to a first distribution area at a current time point that may be used for training the topology-based neural network 430, a second area (e.g., a rewired region) 620 corresponding to a second distribution area at the current time point, and a third area (e.g., a pruning region) 630 corresponding to a third distribution area at the current time point as ground truth and may manage the ground truth as a data set. In an example, the generating apparatus 600 may be one of a training apparatus according, a electronic apparatus, or another apparatus.

Referring to FIG. 7, in an example, the generating apparatus 600 of FIG. 6 may receive the input data 710 including sensing information 601 at a previous time point $T_{n-1}$ and topology information 603 at the previous time point $T_{n-1}$.

Referring to FIG. 6, in an example, the generating apparatus 600 may determine expected path information 615 at a current time point $T_n$ including topology information 613 at the current time point $T_n$ which may be based on the sensing information 601 at the previous time point $T_{n-1}$ and the topology information 603 at the previous time point $T_{n-1}$.

The generating apparatus 600 may generate training data including the first area which includes a feasible path corresponding to an expected path at the current time point $T_n$, the second area in which nodes are rewired corresponding to the topology information at the current time point $T_n$, and the third area in which nodes are pruned at the current time point $T_n$, based on the determined expected path information at the current time point $T_n$.

More specifically, referring to FIG. 7, a since real time response is not required for a data generation process, the generating apparatus may perform a path planner algorithm (e.g., the anytime planning algorithm 550) based on random sampling during a period that is sufficient to calculate an optimal expected path while sufficiently covering an entirety of a search area. In this process, the generating apparatus 600 may label and use state information of nodes corresponding to the expected path determined using the topology information at the current time point $T_n$, such as the label data 730, as the first area (the feasible path region) 640 at the current time point $T_n$. For example, the generating apparatus may label and use state information of nodes, which are rewired and/or reconnected in a tree topology, as the second area (the rewired region) 620 at the current time point $T_n$. In addition, the generating apparatus 600 may label an area in which nodes are allowed to be pruned in the tree topology as the third area (the pruning region) 630 at the current time point $T_n$. For all nodes after obtaining the expected path 770, the generating apparatus may perform reverse scoring and labeling on nodes contributing to reduce a cost to calculate the optimal expected path and nodes which succeeded in node expansion described above.

The training apparatus may train the topology-based neural network to output the expected path 770 corresponding to the input image 750 using the input data 710 and the label data 730.

Figure 8:
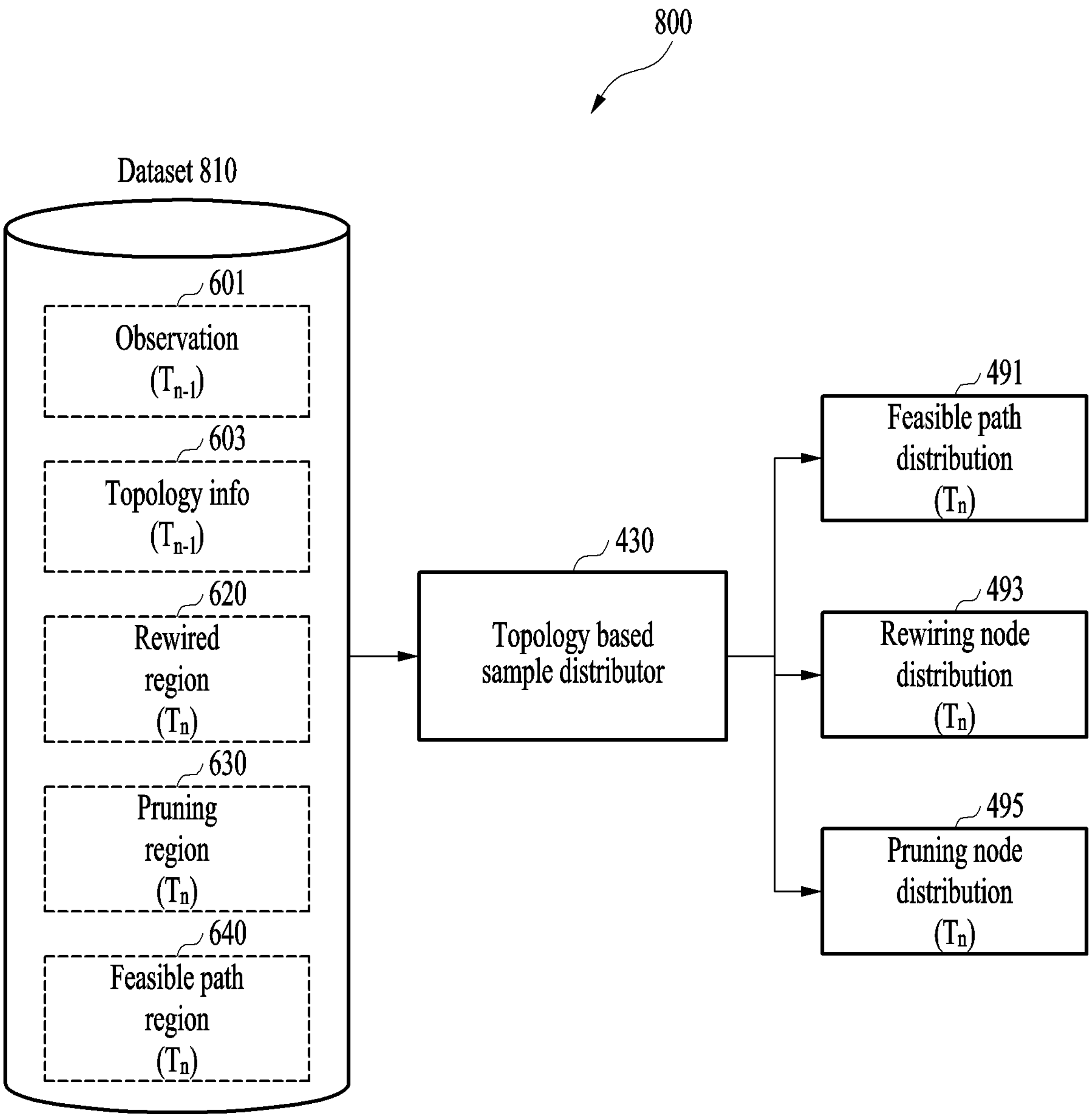
FIG. 8 illustrates an example method of training a neural network according to one or more embodiments.

FIG. 8 illustrates an example training method of a neural network according to one or more embodiments. Referring to FIG. 8, in a non-limiting example, a diagram 800 showing a process of training the topology-based neural network 430 using a training data set 810 generated by the training apparatus with reference to FIG. 6 described above is illustrated.

In an example, the sensing information 601 at the previous time point $T_{n-1}$ used by the generating apparatus to generate the data of FIG. 6, the input data 710 including the topology information 603 at the previous time point $T_{n-1}$, the first area (the feasible path region) 640 at the current time point $T_n$ generated based on the input data 710, the second area (the rewired region) 620 at the current time point $T_n$, and the third area (the pruning region) 630 at the current time point $T_n$, are employed as the training data set 810 to train the topology-based neural network 430.

In this case, sensing information at the current time point and topology information at the current time point $T_n$ may be used as the input data 710 instead of the sensing information 601 at the previous time point $T_{n-1}$ and the topology information 603 at the previous time point $T_{n-1}$. In this case, a first area (a feasible path region) at a next time point $T_{n+1}$ generated based on the input data 710, a second area (a rewired region) at the next time point $T_{n+1}$, and a third area (a pruning region) at the next time point $T_{n+1}$ may be used as the training data set 810 to train the topology-based neural network 430.

In an example, the training apparatus may train the topology-based neural network 430 to infer the first distribution area 491, the second distribution area 493, and the third distribution area 495 based on the training data set 810 collected during the data generation process described above.

The topology-based neural network 430 may include, for example, one or more of a first head, a second head, and a third head that are trained to output sampling areas corresponding to the first distribution area 491, the second distribution area 493, and the third distribution area 495, respectively, as the sensing information 601 at the current time point $T_n$ and the topology information 603 in which nodes are rewired at the previous time point $T_{n-1}$ are input to the topology-based neural network 430. At least one of the first head, the second head, and the third head may be trained based on a first loss based on cross-entropy between a respective sampling area corresponding to the first distribution area 491, the second distribution area 493, and the third distribution area 495, and a respective ground truth area (e.g., the first area 640, the second area 620, and the third area 630) corresponding to the first distribution area 491, the second distribution area 493, and the third distribution area 495, and a second loss based on a mean square error between an expected path found by the topology-based neural network 430 and a respective ground truth area corresponding to the first distribution area 491, the second distribution area 493, and the third distribution area 495.

The training apparatus may receive the training data set 810 including the sensing information 601 at the previous time point $T_{n-1}$, the topology information 603 at the previous time point $T_{n-1}$, the first area 640 (e.g., feasible path region $T_n$) including a feasible path at the current time point $T_n$ corresponding to the topology information at the previous time point $T_{n-1}$, the second area 620 (e.g., rewired region $T_n$) in which nodes need to be reconnected or rewired due to an obstacle at the current time point $T_n$, and the third area 630 (e.g., pruning region $T_n$) in which nodes are allowed to be pruned because nodes are irrelevant to a moving path of a vehicle at the current time point $T_n$.

Based on the training data set 810, the training apparatus may be trained to output at least one sampling area of the first distribution area 491 including the feasible path by the topology-based neural network 430, the second distribution area 493 including reconnected or rewired nodes, and the third distribution area 495 including pruned nodes.

Figure 9:
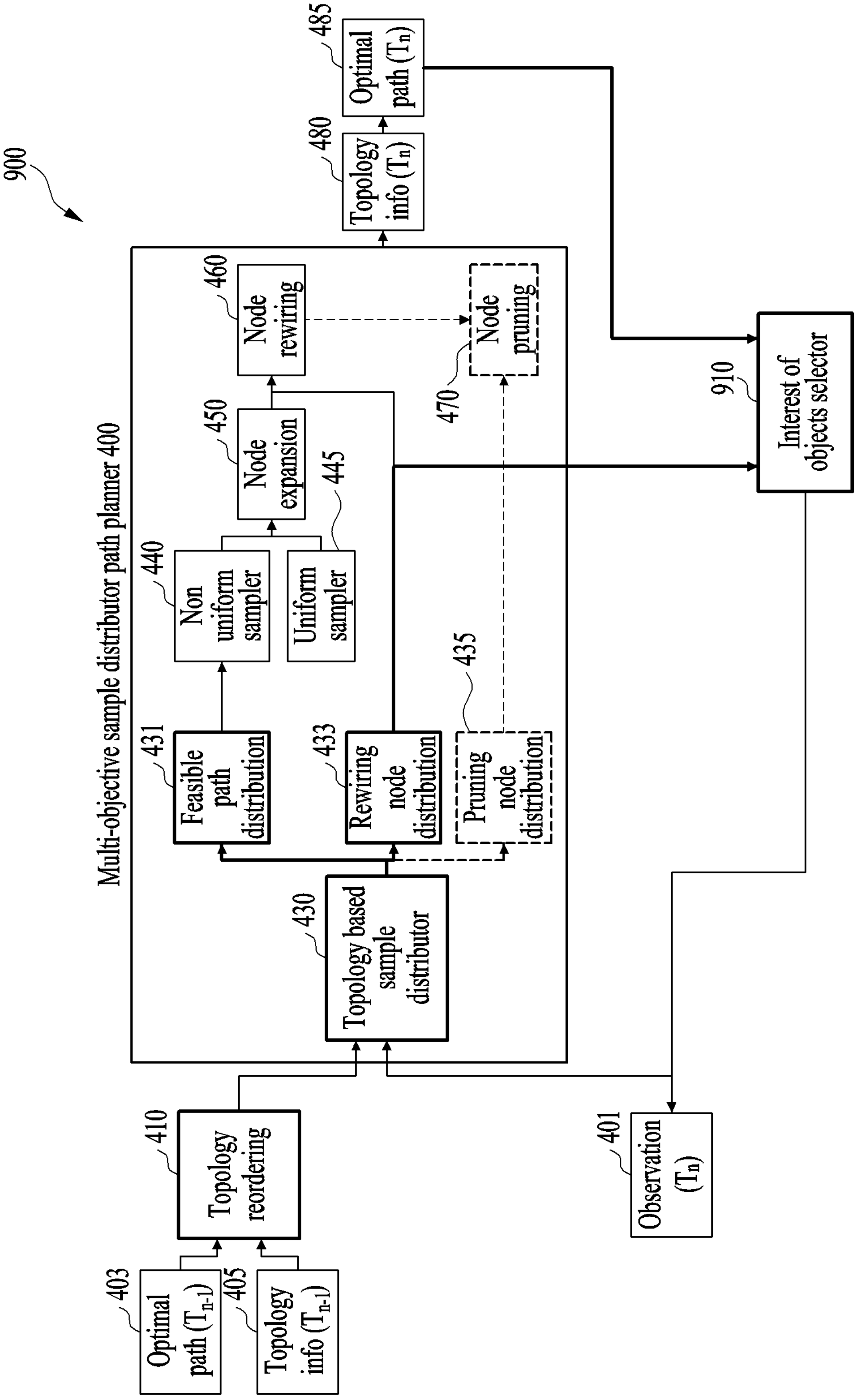
FIG. 9 illustrates an example apparatus with real-time path finding including an object of interest selection module according to one or more embodiments.

FIG. 9 illustrates an example apparatus for real-time path finding including an object of interest selection module according to one or more embodiments. Referring to FIG. 9, in a non-limiting example, a diagram 900 illustrates a structure of the electronic apparatus 400 (e.g., multi-objective sample distributor path planner) that may include an object of interest selection module 910.

In an example, the object of interest selection module 910 may select objects for which attention for adapted cruise control (ACC) or automatic emergency brake (AEB) may be desired by considering a driving path of a vehicle to be objects of interest.

In an example, the object of interest selection module 910 may set objects observed in the second distribution area to be objects of interest by identifying location information of the vehicle changed from the expected path 485 (e.g., optimal path) at the current time point $T_n$ based on the sensing information 401 at the current time point $T_n$ and the rewired nodes in the second distribution area, as described above. In this case, the second distribution area may indicate information on an area where modification of a path is likely to be desired by considering changed surrounding environment information. The object of interest selection module 910 may select an object of interest that further considers a correlation by identifying location information of the expected path at the previous time point $T_{n-1}$ to be changed, where the expected path is already generated, by assigning and managing objects observed in the second distribution area as the objects of interest.

Figure 10:
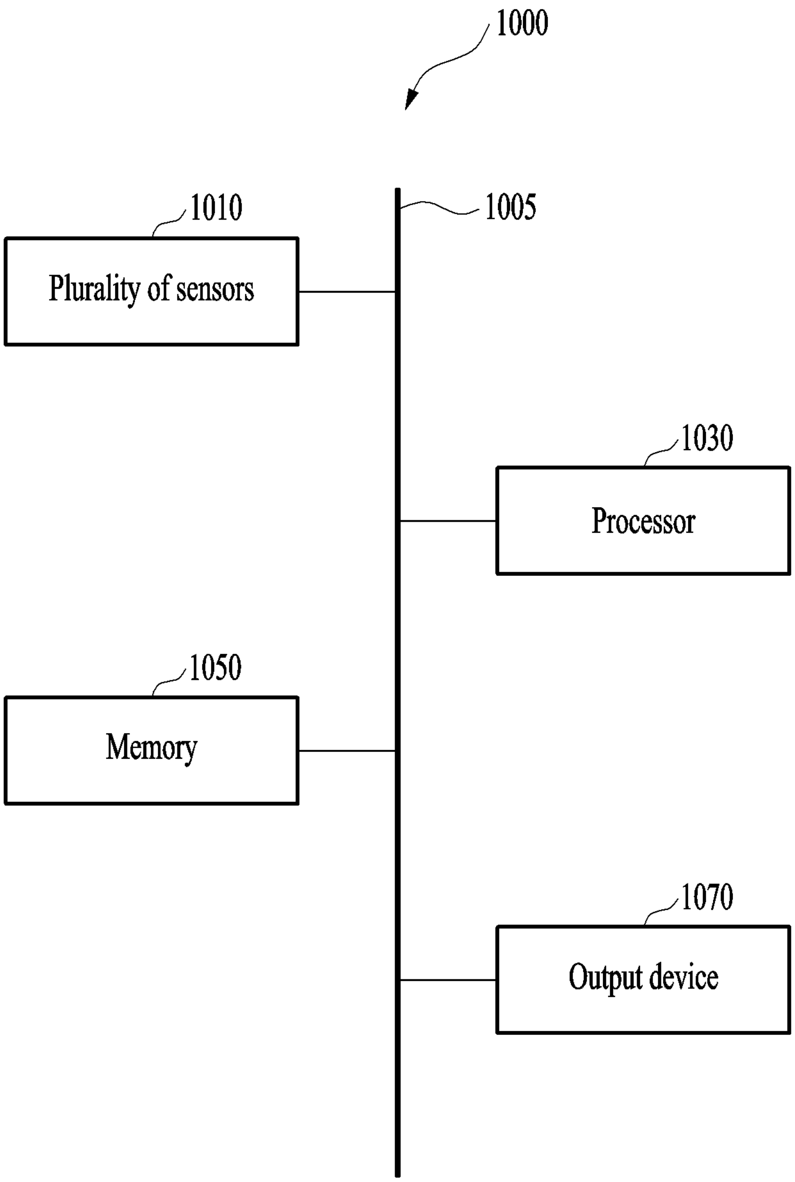
FIG. 10 illustrates an example electronic apparatus according to one or more embodiments.

FIG. 10 illustrates an example electronic apparatus according to one or more embodiments. Referring to FIG. 10, in a non-limiting example, an electronic apparatus 1000 according to one embodiment may include a plurality of sensors 1010, a processor 1030, a memory 1050, and an output device 1070. In an example, the electronic apparatus 1000 may be a vehicle or an ADS or ADAS of such a vehicle, though examples are not limited thereto.

The plurality of sensors 1010 may sense sensing information at a current time point. The plurality of sensors 1010 may include, for example, a mono camera, a vision sensor, an image sensor, and/or a capturing device including an apparatus performing similar functions thereto, as well as a gyro sensor, a lidar sensor, a radar, and/or an odometer, though examples are not limited thereto.

The processor 1030 (or processors) may execute instructions (e.g., code and/or programs), and/or may control other operations or functions of the electronic apparatus 1000 and operations of the vehicle (e.g., vehicle 115), and may include any one or a combination of two or more of, for example, a central processing unit (CPU), a graphic processing unit (GPU), a neural processing unit (NPU) and tensor processing units (TPUs), but is not limited to the above-described examples.

The processor 1030 may embed sensing information at the current time point sensed by the plurality of sensors 1010 with an expected path of a vehicle at a previous time point and topology information at the previous time point. By inputting the embedding information to a topology-based neural network, the processor 1030 may determine a search area to find a path to be at least one of a first distribution area including a feasible path, a second distribution area in which nodes need to be reconnected or rewired in a topology due to an obstacle, and a third distribution area in which nodes are allowed to be pruned from the topology since the nodes are irrelevant to a moving path of the vehicle. In this case, the topology-based neural network may include, for example, at least one of a first head, a second head, and a third head trained to output sampling areas respectively corresponding to the first distribution area, the second distribution area, and the third distribution area including removable nodes as the reordered topology information and the sensing information at the current time point are inputted. At least one of the first head, the second head, and the third head may be trained based on a first loss based on cross-entropy between a sampling area and a ground truth area corresponding to at least one distribution area and a second loss based on a mean squared error between a found expected path and a ground truth area corresponding to at least one distribution area. The neural network may be, for example, a convolutional neural network (CNN), but is not limited thereto. The CNN may be trained to identify both a bounding box of a lane line (or a road sign) to be detected in the input image and the type of the lane line (or the road sign) to be detected in the input image. The processor 1030 may find an expected path from a target location of the vehicle to the current location of the vehicle using the determined topology information at the current time point based on the at least one distribution area.

The memory 1050 may include computer-readable instructions. The processor 1030 may be configured to execute computer-readable instructions, such as those stored in the memory 1050, and through execution of the computer-readable instructions, the processor 1030 is configured to perform one or more, or any combination, of the operations and/or methods described herein. The memory 1050 may be a volatile or nonvolatile memory.

The memory 1050 may store parameters of the topology-based neural network that is pre-trained to determine at least one distribution area. The processor 1030 may find an expected path at the current time point from input data using the topology-based neural network to which parameters stored in the memory 1050 are applied. In addition, the memory 1050 may store various pieces of information generated during the processing process of the processor 1030 described above. In addition, the memory 1050 may store a variety of data and programs. The memory 1050 may include volatile memory or non-volatile memory. The memory 1050 may include a high-capacity storage medium such as a hard disk to store a variety of data.

In an example, the output device 1070 may output the expected path at the current time point found by the processor 1030. For example, the output device 1070 may be an output interface or a display device. When the output device 1070 is a display or a heads-up display (HUD), the output device 1070 may respectively display or project, on an input image or a navigation image, the expected path at the current time point found by the processor 1030. In addition, when it is predicted that a driving lane or a lane needs to be changed according to the expected path at the current time point found by the processor 1030, the output device 1070 may display a direction to which the driving lane is changed.

The processors, memories, vehicle, vehicle 115, electronic apparatus, control 570, generating apparatus 600, plurality of sensors 1010, processor 1030, memory 1050, and output device 1070 described herein and disclosed herein described with respect to FIGS. 1-10 are implemented by or representative of hardware components. As described above, or in addition to the descriptions above, examples of hardware components that may be used to perform the operations described in this application where appropriate include controllers, sensors, generators, drivers, memories, comparators, arithmetic logic units, adders, subtractors, multipliers, dividers, integrators, and any other electronic components configured to perform the operations described in this application. In other examples, one or more of the hardware components that perform the operations described in this application are implemented by computing hardware, for example, by one or more processors or computers. A processor or computer may be implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices that is configured to respond to and execute instructions in a defined manner to achieve a desired result. In one example, a processor or computer includes, or is connected to, one or more memories storing instructions or software that are executed by the processor or computer. Hardware components implemented by a processor or computer may execute instructions or software, such as an operating system (OS) and one or more software applications that run on the OS, to perform the operations described in this application. The hardware components may also access, manipulate, process, create, and store data in response to execution of the instructions or software. For simplicity, the singular term "processor" or "computer" may be used in the description of the examples described in this application, but in other examples multiple processors or computers may be used, or a processor or computer may include multiple processing elements, or multiple types of processing elements, or both. For example, a single hardware component or two or more hardware components may be implemented by a single processor, or two or more processors, or a processor and a controller. One or more hardware components may be implemented by one or more processors, or a processor and a controller, and one or more other hardware components may be implemented by one or more other processors, or another processor and another controller. One or more processors, or a processor and a controller, may implement a single hardware component, or two or more hardware components. As described above, or in addition to the descriptions above, example hardware components may have any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

The methods illustrated in FIGS. 1-10 that perform the operations described in this application are performed by computing hardware, for example, by one or more processors or computers, implemented as described above implementing instructions or software to perform the operations described in this application that are performed by the methods. For example, a single operation or two or more operations may be performed by a single processor, or two or more processors, or a processor and a controller. One or more operations may be performed by one or more processors, or a processor and a controller, and one or more other operations may be performed by one or more other processors, or another processor and another controller. One or more processors, or a processor and a controller, may perform a single operation, or two or more operations.

Instructions or software to control computing hardware, for example, one or more processors or computers, to implement the hardware components and perform the methods as described above may be written as computer programs, code segments, instructions or any combination thereof, for individually or collectively instructing or configuring the one or more processors or computers to operate as a machine or special-purpose computer to perform the operations that are performed by the hardware components and the methods as described above. In one example, the instructions or software include machine code that is directly executed by the one or more processors or computers, such as machine code produced by a compiler. In another example, the instructions or software includes higher-level code that is executed by the one or more processors or computer using an interpreter. The instructions or software may be written using any programming language based on the block diagrams and the flow charts illustrated in the drawings and the corresponding descriptions herein, which disclose algorithms for performing the operations that are performed by the hardware components and the methods as described above.

The instructions or software to control computing hardware, for example, one or more processors or computers, to implement the hardware components and perform the methods as described above, and any associated data, data files, and data structures, may be recorded, stored, or fixed in or on one or more non-transitory computer-readable storage media, and thus, not a signal per se. As described above, or in addition to the descriptions above, examples of a non-transitory computer-readable storage medium include one or more of any of read-only memory (ROM), random-access programmable read only memory (PROM), electrically erasable programmable read-only memory (EEPROM), random-access memory (RAM), dynamic random access memory (DRAM), static random access memory (SRAM), flash memory, non-volatile memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, blue-ray or optical disk storage, hard disk drive (HDD), solid state drive (SSD), flash memory, a card type memory such as multimedia card micro or a card (for example, secure digital (SD) or extreme digital (XD)), magnetic tapes, floppy disks, magneto-optical data storage devices, optical data storage devices, hard disks, solid-state disks, and/or any other device that is configured to store the instructions or software and any associated data, data files, and data structures in a non-transitory manner and provide the instructions or software and any associated data, data files, and data structures to one or more processors or computers so that the one or more processors or computers can execute the instructions. In one example, the instructions or software and any associated data, data files, and data structures are distributed over network-coupled computer systems so that the instructions and software and any associated data, data files, and data structures are stored, accessed, and executed in a distributed fashion by the one or more processors or computers.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents.

Therefore, in addition to the above and all drawing disclosures, the scope of the disclosure is also inclusive of the claims and their equivalents, i.e., all variations within the scope of the claims and their equivalents are to be construed as being included in the disclosure.

What is claimed is:

1. A processor-implemented method, the method comprising:

embedding sensing information, from a plurality of sensors, at a current time point with a previous path of a vehicle at a previous time point and topology information for a topology including plural nodes at the previous time point;

determining, by inputting the embedded sensing information to a topology-based neural network, a first distribution area and a second distribution area within a search area, where the first distribution area includes a determined feasible path and the second distribution area includes disconnected nodes that are determined to be reconnected or rewired due to an obstacle; and generating a current path at the current time point from a target location of the vehicle to a current position of the vehicle using topology information at the current time point determined based on the determining, wherein the determining of the first distribution area and the second distribution area comprises:

expanding one or more of the plural nodes according to a determined feasible path found in the first distribution area; and rewiring one or more of the plural nodes that are determined to be disconnected, in which the plural nodes are determined to be disconnected or newly connected, in the second distribution area based on the topology information at the previous time point and the sensing information at the current time point.

2. The method of claim 1, wherein the embedding comprises:

reordering the topology information at the previous time point based on previous path nodes corresponding to the previous path at the previous time point; and embedding the reordered topology information with the sensing information at the current time point.

3. The method of claim 2, wherein the reordering of the topology information at the previous time point comprises assigning a weight to paths, comprised in the topology information at the previous time point, based on a distance from the previous path at the previous time point.

4. The method of claim 2, wherein the topology-based neural network comprises one or more of a first head, a second head, and a third head, the one or more first head, second head, and third head each being respectively trained to output a respective sampling area corresponding to the first distribution area, the second distribution area, and a third distribution area, the third distribution area including determined prune-eligible nodes which are to be pruned in response to the reordered topology information and the sensing information being received by the topology-based neural network.

5. The method of claim 4, further comprising:

training at least one of the first head, the second head, or the third head based on:

a first loss based on cross-entropy between a training sampling area and a first ground truth area corresponding to a training search area; and a second loss based on a mean squared error between a resultant found previous path and a second ground truth area corresponding to a first distribution area of training the topology-based neural network and a second distribution area of training the topology-based neural network.

6. The method of claim 1, wherein the topology information at the previous time point comprises information on expanded nodes that were expanded up until the previous time point.

7. The method of claim 1, wherein the sensing information at the current time point comprises one or more of surrounding environment information on a surrounding object of the vehicle and an obstacle around the vehicle, a current location of the vehicle, and the target location of the vehicle, and wherein the method further comprises:

receiving the surrounding environment information from a sensor or capturing an image of the surrounding environment information from an image sensor.

8. The method of claim 1, wherein the expanding of the plural nodes comprises:

performing first sampling on the determined feasible path non-uniformly in the first distribution area;

performing second sampling on the determined feasible path randomly in an entirety of the search area; and performing the expanding of one or more of the plural nodes based on a first sampling result and a second sampling result.

9. The method of claim 1, wherein, in a third distribution area, the identified prune-eligible nodes are pruned from the topology upon a determination that one or more of the plural nodes are irrelevant to a moving path of the vehicle, and wherein the prune-eligible nodes are identified based on the third distribution area, from the topology information at the previous time point.

10. The method of claim 9, wherein the prune-eligible nodes comprise one or more of:

a first node in an area where the vehicle has passed at the current time point; and a second node in an area irrelevant to a moving path of the vehicle.

11. The method of claim 1, further comprising:

assigning objects observed in the second distribution area to be objects of interest by identifying location information of the vehicle changed from the current path at the current time point based on the sensing information of the current time point and the one or more rewired nodes.

12. The method of claim 1, further comprising:

iteratively finding the current path at the current time point from the target location of the vehicle to a moved current location of the vehicle as the vehicle moves.

13. A training method of a neural network, the method comprising:

receiving a training data set comprising sensing information of a vehicle at a previous time point, topology information for a topology including plural nodes at the previous time point, a first area including a feasible path at a current time point corresponding to the topology information at the previous time point, a second area in which blocked nodes of the plural nodes are determined for rewiring due to an obstacle at the current time point, and a third area in which prune-eligible nodes of the plural nodes are to be pruned as being irrelevant to a moving path of the vehicle at the current time point; and training the neural network to output one or more sampling areas, the sampling areas including a first distribution area including the feasible path, a second distribution area including the blocked nodes, and a third distribution area including the prune-eligible nodes based on the training data set;

training the neural network using a training data set to expand one or more of the plural nodes according to a determined feasible path found in the first distribution area; and training the neural network, using the training data set, to rewire the one or more plural nodes in an area in which one or more of the plural nodes are determined to be disconnected or newly connected, in the second distribution area, based on the topology information at the previous time point and the sensing information at the current time point.

14. The training method of claim 13, wherein the neural network comprises a first head, a second head, and a third head, the first head, the second head, and the third head being respectively trained to output respective sampling areas corresponding to the first distribution area, the second distribution area, and the third distribution area in response to the topology information in which the nodes are rewired and the sensing information at the current time point being received by the neural network.

15. The training method of claim 14, further comprising:

training at least one of the first head, the second head, or the third head based on:

a first loss based on cross-entropy between a first respective ground truth area corresponding to a training first distribution area of training the neural network, a training second distribution area of training the neural network, and a training third distribution area of training the neural network, and a training sampling area corresponding to the first distribution area, the second distribution area, and the third distribution area; and a second loss based on a mean squared error between a previous path found by the neural network and a second respective ground truth area corresponding to the first training distribution area, the second training distribution area, and the third training distribution area.

16. An electronic apparatus, the apparatus comprising:

processors configured to execute instructions;

a plurality of sensors configured to sense sensing information at a current time point; and a memory storing the instructions, wherein execution of the instructions configures the processors to:

embed the sensing information at the current time point with a previous path of a vehicle at a previous time point and topology information of a topology including plural nodes at the previous time point, determine, by inputting the embedded sensing information to a topology-based neural network, a first distribution area, a second distribution area, and a third distribution area within a search area, where the first distribution area includes a determined feasible path, the second distribution area includes disconnected nodes that are determined to be reconnected or rewired due to an obstacle, and the third distribution area includes prune-eligible nodes that are determined to be pruned from the topology as being irrelevant to a moving path of the vehicle, generate a current path at the current time point from a target location of the vehicle to a current position of the vehicle using topology information at the current time point determined based on the first distribution area, the second distribution area, and the third distribution area, wherein the determining of the first distribution area and the second distribution area comprises:

expand one or more of the plural nodes according to a determined feasible path found in the first distribution area; and rewire the one or more plural nodes in an area in which one or more of the plural nodes are determined to be disconnected or newly connected, in the second distribution area, based on the topology information at the previous time point and the sensing information at the current time point.

17. The electronic apparatus of claim 16, wherein the processors are further configured to:

among the rewired nodes, prune a prune-eligible node, based on the third distribution area, from the topology information.

18. The electronic apparatus of claim 16, wherein the embedding comprises:

reordering the topology information at the previous time point based on previous path nodes corresponding to the previous path at the previous time point; and embedding the reordered topology information with the sensing information at the current time point, wherein the topology-based neural network comprises:

a first head, a second head, and a third head respectively trained to output a respective sampling area corresponding to the first distribution area, the second distribution area, and a third distribution area comprising the determined prune-eligible nodes in response to the reordered topology information and the sensing information at the current time point being received by the topology-based neural network.

19. The electronic apparatus of claim 18, wherein at least one of the first head, the second head, or the third head is trained based on:

a first loss based on cross-entropy between a training sampling area and a first ground truth area corresponding to a training search area; and a second loss based on a mean squared error between a resultant found previous path and a second ground truth area corresponding to a first distribution area of training the topology-based neural network and a second distribution area of training the topology-based neural network, and wherein the apparatus comprises a vehicle.

* * * * *